United States Patent
Reddy

(10) Patent No.: US 6,279,548 B1
(45) Date of Patent: Aug. 28, 2001

(54) EVAPORATIVE EMISSION CONTROL CANISTER SYSTEM FOR REDUCING BREAKTHROUGH EMISSIONS

(75) Inventor: Sam Raghuma Reddy, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/459,101

(22) Filed: Dec. 13, 1999

(51) Int. Cl.$^7$ ............... F02M 33/04; F02G 5/00
(52) U.S. Cl. ............ 123/520; 123/557; 123/519
(58) Field of Search .................. 123/516, 518, 123/519, 520, 549, 557

(56) References Cited

U.S. PATENT DOCUMENTS

| | | | |
|---|---|---|---|
| 4,598,686 | 7/1986 | Lupoli et al. | 123/519 |
| 4,732,588 | 3/1988 | Covert et al. | 55/196 |
| 4,778,495 | 10/1988 | Bishop et al. | 55/269 |
| 4,864,103 | 9/1989 | Bishop et al. | 219/375 |
| 5,355,861 * | 10/1994 | Arai | 123/519 |
| 5,377,644 * | 1/1995 | Krohm | 123/520 |
| 5,456,236 * | 10/1995 | Wakashiro et al. | 123/519 |
| 5,482,023 * | 1/1996 | Hunt et al. | 123/520 |
| 5,687,697 * | 11/1997 | Ishikawa et al. | 123/520 |
| 6,098,601 * | 8/2000 | Reddy | 123/520 |

* cited by examiner

Primary Examiner—Thomas N. Moulis
(74) Attorney, Agent, or Firm—George A. Grove

(57) ABSTRACT

The effectiveness against vapor breakthrough of an adsorbent material (e.g., activated carbon granules) containing canister in an evaporative fuel emission control system is greatly increased by employing a relatively small secondary volume of adsorbent downstream of the vapor vent of the primary adsorbent volume and heating the secondary volume just prior to commencing the flow of purge air back through the two adsorbent volumes to remove adsorbed fuel and carry the purged fuel to the induction system of an associated engine. The secondary volume is heated to a temperature enabling complete purging of hydrocarbons from it and, thus, to greatly increase the capacity of that volume to prevent fuel vapor breakthrough during the subsequent engine-off fuel vapor storage cycle. The secondary volume may be contained in a common canister with the primary volume or in a secondary canister.

14 Claims, 6 Drawing Sheets

EVAPORATIVE EMISSION CONTROL CANISTER SYSTEM FOR REDUCING BREAKTHROUGH EMISSIONS

TECHNICAL FIELD

This invention pertains to evaporative fuel vapor emissions from automotive vehicles. More specifically, this invention pertains to an improved fuel vapor adsorption canister system and method of operation that reduces the breakthrough of fuel vapor to the atmosphere.

BACKGROUND OF THE INVENTION

Fuel evaporative emission control systems have been in use on automotive vehicles for over 30 years. The gasoline fuel used in many internal combustion engines is quite volatile. The fuel typically consists of a hydrocarbon mixture ranging from high volatility butane (C-4) to lower volatility C-8 to C-10 hydrocarbons. When a vehicle is parked in a warm environment during the daytime heating (i.e., diurnal heating), the temperature in the fuel tank increases. The return of hot fuel from the engine also heats the contents of the fuel tank. The vapor pressure of the heated gasoline increases and fuel vapor will flow from any opening in the fuel tank. Normally, to prevent fuel vapor loss into the atmosphere, the tank is vented through a conduit to a canister containing suitable fuel adsorbent material. High surface area activated carbon granules are widely used to temporarily adsorb the fuel vapor.

The fuel vapor enters the canister through a top inlet of the canister and diffuses downwardly under its own pressure and gravity into the bed of carbon granules where it is adsorbed in temporary storage. The total volume of adsorbent is specified so as to be suitable to retain a quantity of fuel vapor expected to evaporate from the fuel tank during normal or representative usage of the vehicle.

The canister is molded of a thermoplastic material and shaped so that ambient air can be drawn through the carbon granule bed during engine operation to purge adsorbed fuel from the surfaces of the carbon particles and carry the removed fuel vapor into the air induction system of the vehicle. Typically, a partition is formed in the canister to lengthen the flow path of vapor and air through the volume of carbon particles. Thus, the fuel vapor enters at one end of the flow path and escapes to the atmosphere at the opposite end, the vent end, if the quantity of fuel exceeds the adsorption capacity of the carbon volume. Ambient air, induced to flow through the activated carbon bed under engine intake vacuum, enters the canister at the "vent" end of the flow path. The air traverses the full length of the flow path and exits the canister with desorbed, i.e., purged fuel at the vapor inlet end of the carbon volume. Typically, neither the canister nor the purge air experience heating other than ambient heating.

The described emission control system obviously works in a repeating cyclical mode. When the engine is not running, fuel vapor generated by diurnal heating, or the like, flows to the canister and is adsorbed up to the capacity of the adsorbent volume. The vehicle may remain idle for several days and fuel vapor will accumulate in the canister. The initial loading will be at the inlet end of the adsorbent volume but the fuel gradually becomes distributed along the entire adsorbent bed pathway. When the vehicle engine is started and can accommodate a secondary fuel-air mixture, a purge valve is opened and purge air is drawn through the adsorbent volume. Purging can continue as long as the engine is running and the air can cause the removal of a substantial portion of the stored fuel vapor. But a portion of the adsorbed hydrocarbons remain adsorbed on the carbon. That portion is called the "heel" and it significantly limits the capacity of the carbon to adsorb additional fuel.

Environmental regulators are proposing lower limits on the amount of fuel vapor that can escape the evaporative emission system during a prescribed test of the system in a closed space called SHED (Sealed Housing for Evaporative Determination). For example, the California Air Resources Board (CARB) has proposed "near zero" and "zero" evaporative emission standards for automotive vehicles for year 2004. The proposed standards require near-zero fuel vapor emissions from all the sources: permeation losses through plastic fuel system parts; leaks through the fittings and joints; and canister breakthrough emissions. Reducing the emissions through the leaks involves the selection of better sealing joints and connectors or eliminating some of joints, and reducing permeation losses involves the selection of low permeability or no permeability materials, whereas reducing canister breakthrough emissions to near-zero requires new technologies in the canister design. An object of this invention is to provide a canister system, and method of operating the system, that will limit canister breakthrough emissions to less than 0.02 grams fuel loss per test.

SUMMARY OF THE INVENTION

In one aspect, this invention provides a method of increasing the adsorption capacity of an evaporative emission control system by selectively heating a small portion of the adsorption material before air purging of the canister. Granular activated carbon is a preferred adsorbent material. The adsorbent portion that is heated is located at the purge air inlet region of the canister system. Generally, only about 1% to 5%, and preferably less than 3%, by volume of the total adsorbent is heated prior to purging. But that portion is heated to a temperature at which the normal flow of ambient purge air will remove substantially all of the adsorbed fuel, including the hydrocarbon heel, during a purge cycle. When high surface area carbon granules are employed, the upstream secondary carbon volume is preferably heated to about 350° F. (177° C.).

A volume of carbon granules heated to 350° F. is readily stripped of gasoline vapor with a flow of ambient air of suitable duration. No hydrocarbon heel remains in the heated volume, and during the subsequent vapor loading cycle, vapor breaking through the main carbon volume is readily adsorbed in the "green," or hydrocarbon-free, secondary volume.

Preferably, the relatively small secondary volume of adsorbent is thus heated prior to each purge cycle. Heating may be initiated by the engine control computer module and accomplished using vehicle battery-powered, embedded electrical heating elements, or the like. When a temperature sensor in the secondary adsorbent volume indicates that a suitable purge temperature has been reached, the engine control computer causes the heater to be shut off and the purge valve to be opened. Engine induction system vacuum induces the flow of purge air from the engine compartment, through the secondary and primary adsorbent volumes and into the operating engine. The air flow both strips the volume of hydrocarbons and cools the granules to restore their full adsorptive capacity before the next vapor load cycle.

The secondary volume of adsorbent may be located in the canister adjacent the air purge inlet. In this embodiment, the secondary volume is closely adjacent the main adsorbent volume and it may be preferable to provide some thermal insulation between them. In a second embodiment, the small heated volume is located in a smaller, secondary molded canister in the air inlet line with the vent valve.

Other objects and advantages of the invention will become more apparent from a detailed description of preferred embodiments that follows. The description will refer to the drawings that are described in the next section of this specification.

DESCRIPTION OF THE PREFERRED EMBODIMENT

Figure 1:
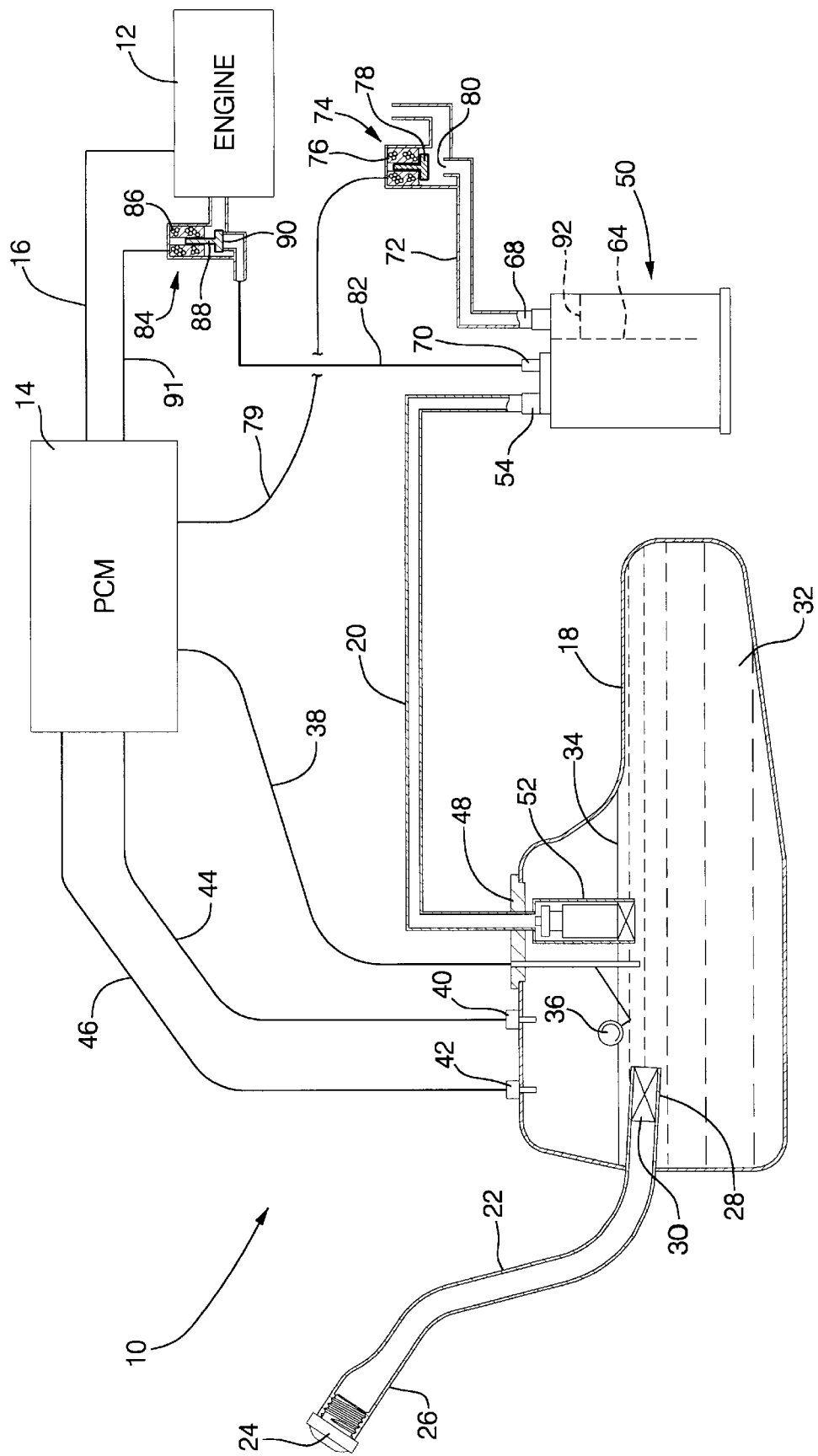
FIG. 1 is a schematic view of the evaporative fuel emissions control system of an automobile.

A typical evaporative fuel emissions control system 10 for an automotive vehicle is illustrated in FIG. 1. The illustration is schematic and the components are not drawn to scale.

The system comprises an engine schematically indicated at block 12. However, the engine would typically be a multi-cylinder, gasoline-powered, internal combustion engine. The operation of a modern fuel efficient, low exhaust and evaporative emissions engine is controlled using a suitable programmed digital microprocessor or computer, indicated at block 14. The microprocessor is part of a control module that controls the operation of at least the engine and its emission controls (an engine control module, ECM) or the engine and transmission (a powertrain control module, PCM). Such control modules in various similar forms are used on millions of cars, sport utility vehicles, trucks, and the like, today.

When the engine is started, the control module, which is powered by the vehicle battery, not shown, starts to receive signals from many sensors on the engine, transmission and emission control devices. Line 16 from the engine 12 to control module 14 schematically depicts the flow of such signals from the various sensors on the engine. During engine operation, gasoline is delivered from a fuel tank 18 by a fuel pump (not shown, but often located in the fuel tank) through a fuel line, not shown, to a fuel rail and fuel injectors that supply fuel to each cylinder of the engine or to ports that supply groups of cylinders. The timing of the operation of the fuel injectors and the amount of fuel injected per cylinder injection event is managed by the control module 14. The subject emission control purge system is operated in harmony with engine operation to avoid upsetting the air-to-fuel ratio in the engine.

Since gasoline and other fuels are quite volatile, fuel tank 18 is closed except for a vent line 20. Tank 18 is often made of blow molded, high density polyethylene provided with a suitable interior gasoline impermeable layer(s). The tank 18 is provided with fill tube 22 with a gas cap 24 closing the gas fill end 26. The outlet end 28 of fill tube 22 is inside tank 18 and is provided with a one-way valve 30 to prevent liquid fuel from splashing out the fill tube 22.

A volume of gasoline 32 is indicated with upper surface 34. A float-type fuel level indicator 36 provides a fuel level signal through line 38 to the control module 14. Fuel tank pressure sensor 40 and temperature sensor 42 provide their respective data through signal transmitting lines 44 and 46, respectively, to controller 14. These sensors are not necessarily present in all evaporative control systems and sometimes their functions may be combined. They are sometimes used for diagnostic purposes.

Fuel tank 18 is provided with a vent line 20 that leads through seal 48 from the top of the tank to a fuel vapor adsorption canister 50. Float valve 52 within the tank 18 prevents liquid gasoline from entering vapor vent line 20. During heating of the fuel in the tank by liquid fuel returned from the hot engine (through fuel return line, not shown) or by ambient heating, hydrocarbon fuel vapor is generated from the gasoline. Vapor mixed with air flows under the vapor pressure through vent line 20 to the vapor inlet of canister 50 (see FIGS. 1 and 2). The vapor enters canister vapor inlet 54, flows past granule retainer element 56 and diffuses into primary volume 57' and 57" of adsorptive material 58.

Canister 50 is typically molded of a suitable thermoplastic polymer such as nylon. In this embodiment, canister 50 comprises four side walls, defining an internal volume of rectangular cross section (two side walls 60 shown), with an integral top 62 and a vertical internal partition 64 that extends from top 62 and the non-shown front and rear sides. Canister 50 includes a bottom closure 66 that is attached to the side walls. At the top of canister 50 is a vent opening 68 that also serves as an inlet for the flow of air during the purging of adsorbed fuel vapor from the adsorbent material 58. Also formed in the top 62 of the canister 50 is a purge outlet 70 through which a stream of purge air and purged fuel vapor can exit the canister.

Connected to vent opening 68 is a vent line 72 (see FIG. 1) and solenoid actuated vent valve 74. Vent valve 74 is normally open as shown, but upon actuation of battery powered solenoid 76, stopper 78 is moved to cover vent opening 80. Solenoid 76 is actuated upon command of control module 14 through signal lead 79. The vent valve 74 is usually only closed for diagnostic purposes.

Purge outlet 70 is connected by purge line 82 through solenoid actuated purge valve 84 to the engine 12. Purge valve 84 includes a battery powered solenoid 86 and stopper 88 to close purge opening 90. Purge valve 84 is opened only by command of control module 14 through signal lead 91 when the engine 12 is running and can accommodate the fuel-laden air stream drawn through canister 50.

Referring again to FIG. 2, it will be appreciated that as an airfuel mixture flows from the fuel tank through vent line 20 and through the inlet 54 into canister 50, fuel vapor will be absorbed onto the granules of adsorbent material 58 in the canister. Gradually, the granules of activated carbon or other suitable adsorbent material will become laden with butane and heavier hydrocarbons, and the vapor will further settle into the portion of adsorbent material 58 on the left side volume 57' of partition 64. While partition 64 extends from the top 62 of the canister, it does not reach all the way to the bottom closure piece 66.

Thus, there is a flow path from the granules 58 on the left side volume 57' of partition 64 up into the granules on the right side volume 57" of partition 64. When vent valve 74 is open, the air-fuel mixture can ascend the adsorbent material to the right of partition 64 and gradually pass through a porous, thermal insulator separator 92 into a secondary volume 93 of adsorbent material 94. Embedded in this secondary volume 93 of adsorbent material is an electrical heating element 96. The secondary volume of adsorbent material 94 is held in a relatively small compartment between porous separator 92 and a granule retainer element 98. Once both the primary volume 57', 57" of adsorbent material 58 and the secondary volume 93 become saturated with vapor, then vapor will accompany air exiting the canister at vent outlet 68 and pass through vent line 72 and through the open solenoid-actuated valve 74.

The flow path of fuel-laden vapor entering the canister through inlet 54 is extended by partition 64 to include two vertical portions 57', 57" of the primary adsorbent material 58 and a smaller volume 93 of adsorbent material 94. Although the secondary volume of adsorbent may be somewhat larger, preferably it is less than 3% of the primary absorbent volume.

Conversely, when the engine is operating and the control module 14 has opened purge valve 84 to permit air to be drawn past vent valve 74 through vent line 72 and into the vent/purge inlet 68, the purge air is drawn through the extended path, i.e., through the secondary adsorbent volume 93 and the primary adsorbent volume 57', 57". The air stream laden with desorbed fuel vapor exits purge vent 70 and is drawn through purge line 82, through purge valve 84, into the induction system of the engine 12. It is realized that the temperature of the primary adsorbent volume 58 is that of the ambient temperature of the engine compartment, also taking into consideration any heat of adsorption or desorption of the fuel vapor. However, before the purge solenoid 84 is opened, a command is issued from the control module 14 to actuate heating element 96 by battery (not shown) power until the secondary volume 93 is heated to a relatively high temperature at which substantially all fuel vapor is desorbed by the ambient air stream passing through the secondary adsorbent volume. The temperature of the secondary volume is controlled by the engine control module utilizing the temperature sensor information from temperature sensor 100.

A preferred adsorbent material is activated carbon granules. As stated, whereas the carbon granules in the primary volume of the canister 58 are not especially heated, the granules in the secondary volume 93 are heated to a suitable temperature such as 350° F., at which the ambient air strips substantially all fuel vapor from the secondary volume. At this temperature the secondary volume is rapidly stripped of fuel. Further air flow cools the secondary volume for effective high capacity adsorption during a subsequent diurnal cycle.

A Second Embodiment

Figure 2:
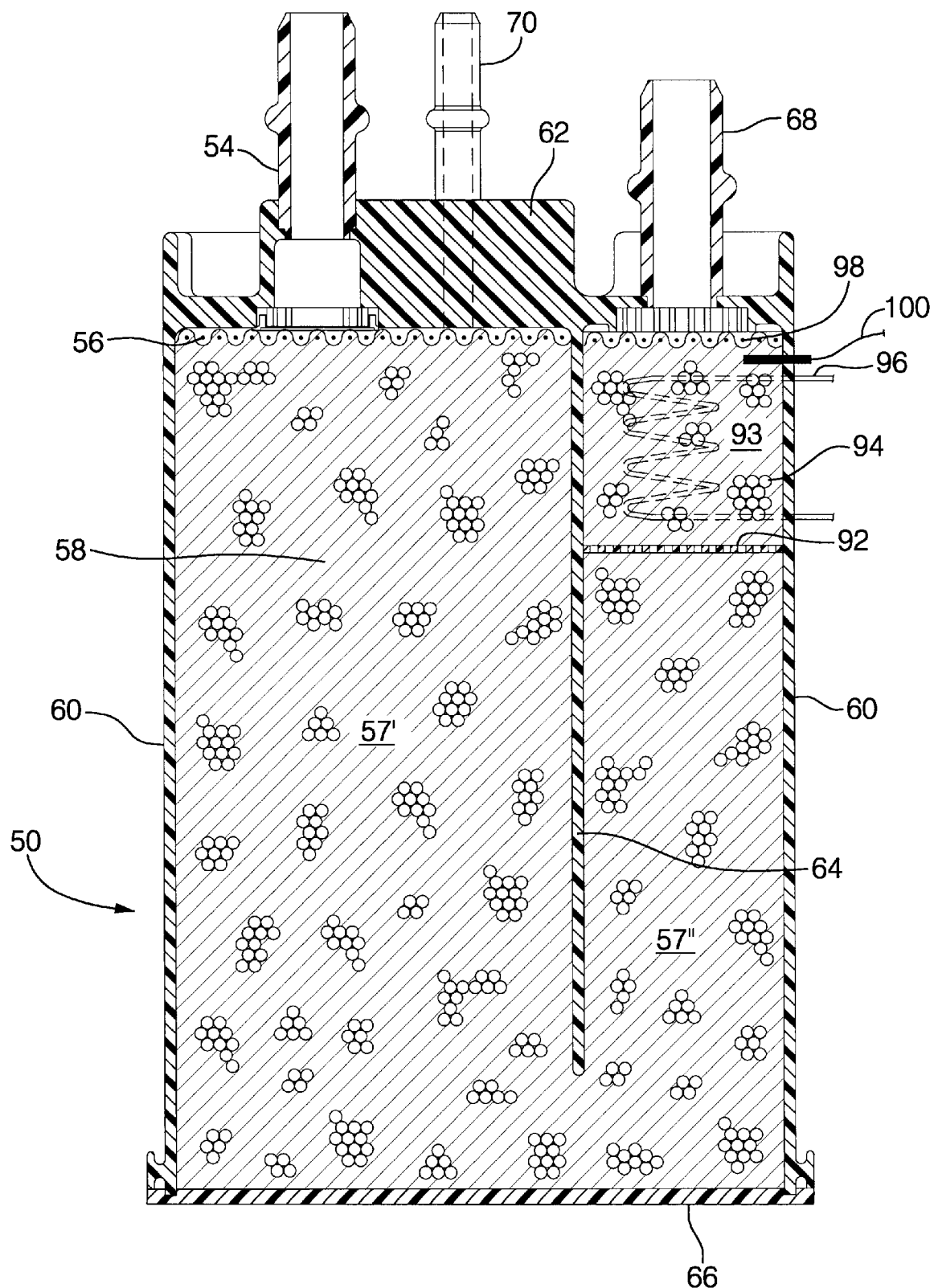
FIG. 2 is a sectional view of a carbon granule filled canister in accordance with a first embodiment of the invention.
Figure 3:
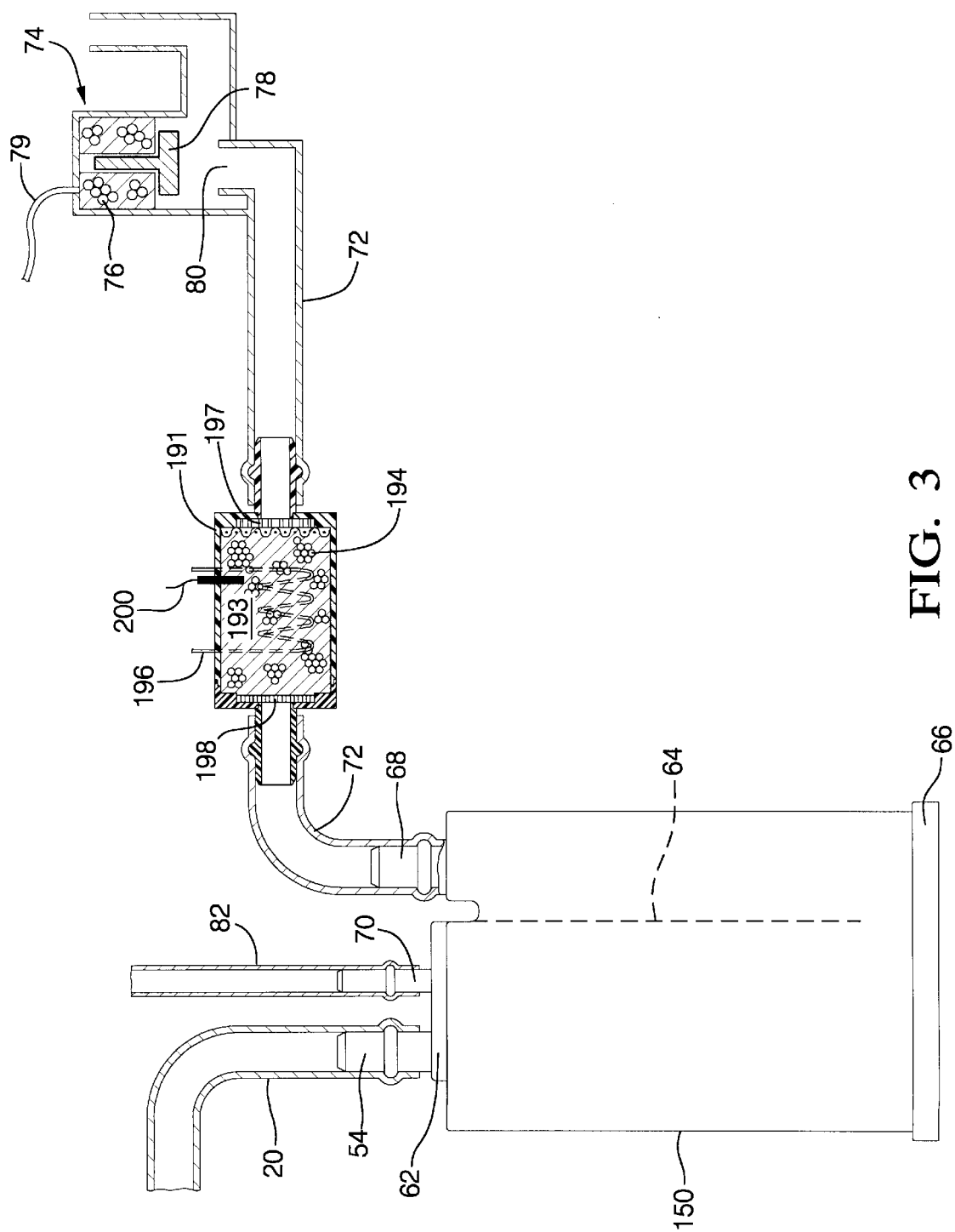
FIG. 3 is a sectional view of a secondary carbon granule filled canister in accordance with a second embodiment of the invention.

FIG. 3 illustrates a second embodiment of the invention in which the secondary volume 193 of adsorbent carbon granules (for example) 194 are contained within a Stage II canister 191 located in the vent line 72 between a conventional canister 150 and vent valve 74. Canister 150 is quite similar to the canister 50 depicted in FIG. 2 (and thus the common parts are identified by the same numbers) except that the secondary volume of adsorbent is not contained within canister 150.

Stage II canister 191 contains a relatively small volume of carbon granules, suitably only about two to ten percent by volume of the primary volume of granules in unheated canister 150. Canister 191 includes the secondary volume 193 of adsorbent granules 194 and heating element 194. Heating element 194 is tuned on by a suitable signal lead, not shown, from controller 14 (FIG. 1) prior to opening of purge vent 84 and the commencement of purge air flow. The granules are retained by porous retainers 197 and 198 that permit purge air flow through the canister 191 and vapor over from canister 150 into the secondary volume 193.

Thus, air and fuel vapor overflow from canister 150 enters canister 191 and the fuel vapor is temporarily adsorbed. At a suitable time following engine startup, heater 196 is activated and the granules heated to about 350° F. using temperature sensor 200. After the purge solenoid 84 (FIG. 1) is opened, air flows through vent valve 74 in to the hot secondary volume to fully remove all adsorbed fuel vapor.

Experimental

The subject invention is better understood following a description of the mechanism of canister breakthrough emissions. Breakthrough emissions from a green or virgin canister are very low as shown by the data in FIG. 4. For comparison, the breakthrough emissions from a used canister are also shown in FIG. 4.

Each canister contained 1850 cubic centimeters of commercial activated carbon granules specified to have an adsorption working capacity of 15 grams of butane per 100 cc granules (15BWC). The "green" canister contained unused carbon granules. The carbon granules in the "used" canister had been saturated with butane and then purged with a stream totaling ten cubic feet of ambient air. For convenience, a mixture of 40 parts by volume butane and 60 parts by volume air was used instead of gasoline vapor to load and evaluate the adsorption capacities of the canisters. Butane/air mixtures are commonly used in the canister studies, and butane loading is also used in the CARB and Federal test procedures.

The green canister was loaded with 40 g of butane from a 40:60 butane/air mixture to simulate the loading of a vehicle canister with gasoline vapor. The experiment was conducted in a closed container like the SHED test procedure for evaluating automotive evaporative emission systems. As the carbon was being loaded with butane from the synthetic mixture, the atmosphere around the canister was tested with a flame analyzer to detect any escape or "breakthrough" of butane.

Figure 4:
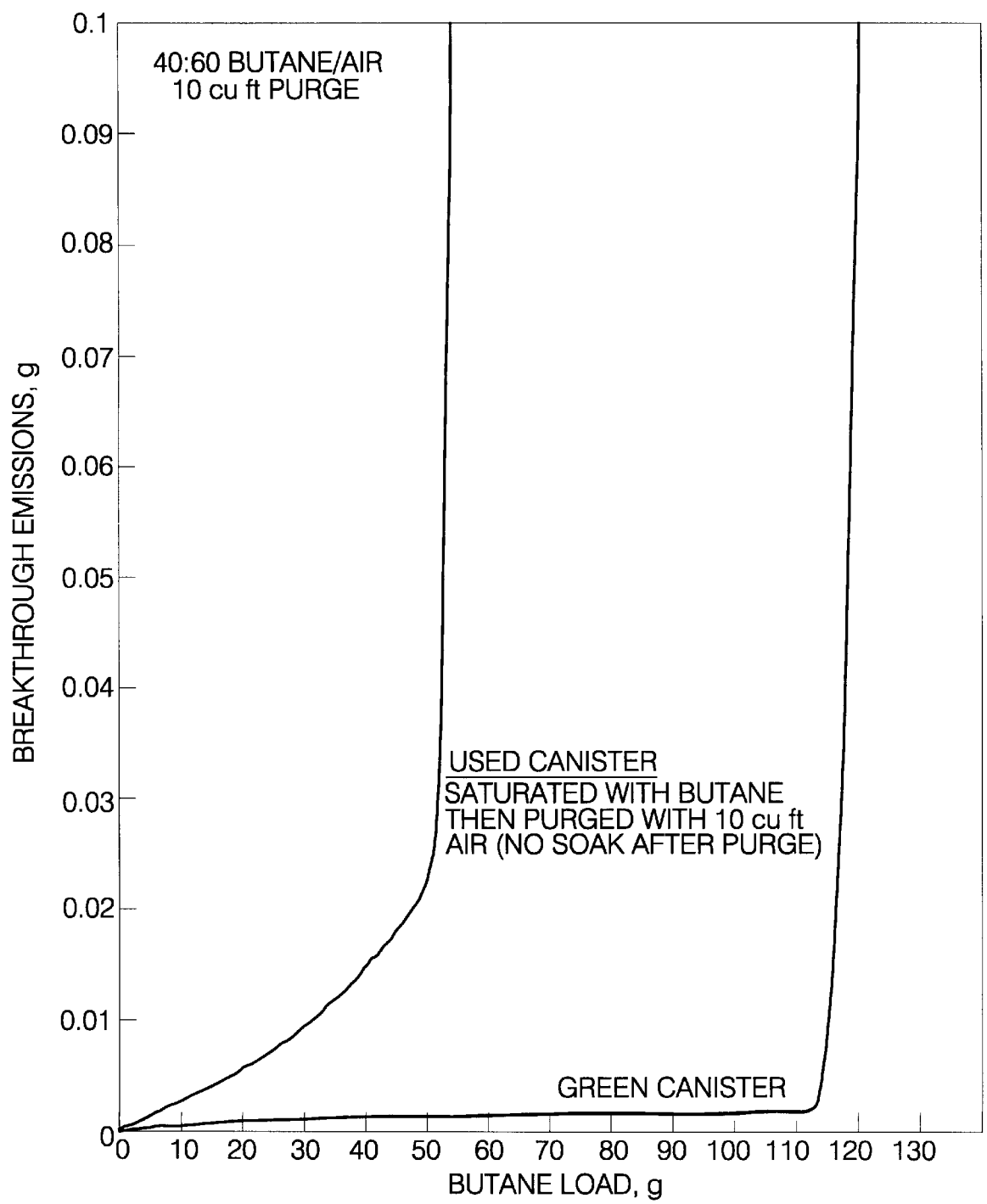
FIG. 4 is a graph of breakthrough emissions, in grams, of butane versus butane load, in grams, for a green carbon canister and a used carbon canister.

FIG. 4 records the cumulative weight of breakthrough emissions of butane, in grams, versus the weight of butane being adsorbed by the respective carbon granule-filled canisters. It is seen that the green carbon canister lost only about 0.001 g of butane while being loaded with about 40 grams of butane. In fact, there was no significant breakthrough of butane from the green canister until its loading reached about 109 grams of butane. At that point in the loading process, substantially all of the butane entering the canister was escaping from its vent opening. In contrast, as FIG. 4 shows, the "used" canister permitted a significant amount of butane to break through from the beginning of the loading process.

The difference in performances of the green and used canisters is explained as follows. After several load/purge cycles, an adsorbent canister builds a residual hydrocarbon content, called a heel, and reaches a stable adsorption capacity which is lower than the adsorption capacity of a green canister. The residual hydrocarbon in the pores of the granules of activated carbon is difficult to remove by air purging and is, therefore, called "heel". Breakthrough emissions from the used canister were higher than those from the green canister (FIG. 4) because of the hydrocarbon heel on the used carbon. Thus, the 40 g butane loading resulted in 0.016 g of breakthrough emissions from the used canister compared to 0.001 g from the green canister.

The heel is not distributed uniformly. There is less heel where the purge air enters the canister and more heel where the fuel tank vapor enters the canister. It can be observed that if a purged canister is allowed to simply stand for some time before loading (called soak or soaking), the breakthrough emissions increase further as shown by the data in FIG. 5. During a soak period, the hydrocarbon heel redistributes more uniformly over the volume or bed of carbon. This redistribution reduces the loading capacity of the carbon even more and increases breakthrough emissions as illustrated in FIG. 5.

Figure 5:
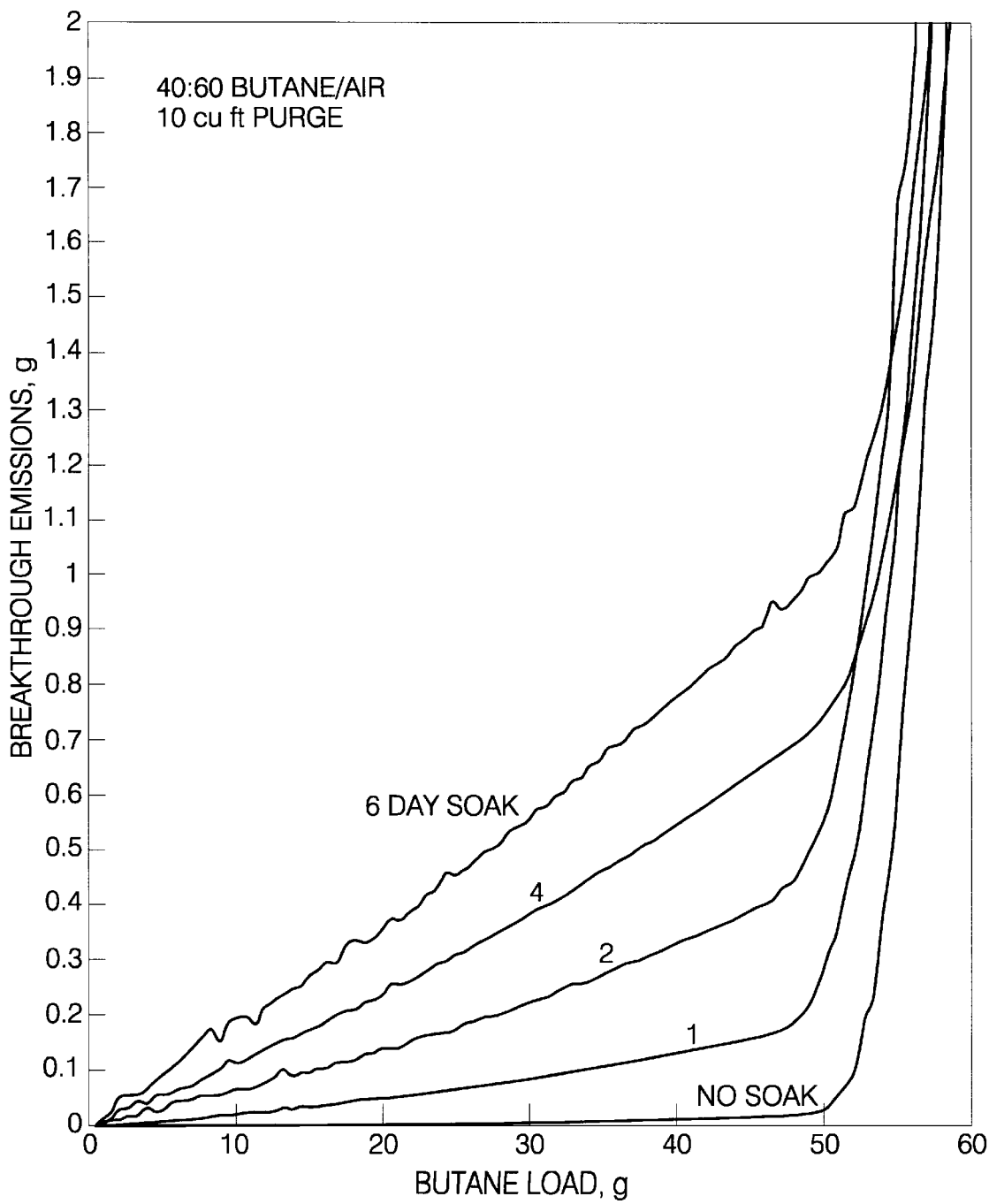
FIG. 5 is a graph using the same ordinates as FIG. 4 but illustrating the effect of increasing soak periods on breakthrough emissions.

FIG. 5 records the SHED test data of a group of substantially identical 1850 cc 15BWC canisters that had been loaded with butane from a 40:60 butane/air mixture and then purged with a total of 10 cubic feet of air flow. The first canister was then immediately tested (no soak period) during reloading with a 40:60 butane/air mixture. Subsequent canisters were tested in the same way after increasing soak periods of one, two, four and six days, respectively. It is clearly seen that the breakthrough emissions of butane increased from canisters subjected to a longer soak periods. Although each of these canister performances meet 1999 emission requirements, it is clear that they can release hydrocarbons after appreciable soak periods.

Similar results were obtained when the test was repeated by increasing the purge air volume to 20 cu ft. In real world and also in the CARB test, the purged canister experiences some soaks before loading; therefore, it is desirable to find ways to reduce the breakthrough emissions to near-zero from a soaked canister. By using a small secondary volume of adsorbent in series with the primary volume of fuel vapor adsorbent, the breakthrough emissions can be reduced to near-zero as demonstrated in the following experiment.

Heated Stage II Canister

Extrapolating on the very low breakthrough emissions from the green canister (FIG. 4), it has been found that near-zero breakthrough emissions from a used canister can be realized if there is some activated carbon without any heel at the vapor exit (e.g., volume 93 in FIG. 2 or Stage II canister 191 in FIG. 3). However, it is found that heel cannot be removed completely by purging with ambient air. The heel can be completely removed by heating the carbon and then purging with air. Experimental data had shown that if the carbon is heated to 350° F. and then purged with air, the heel is removed completely. Based on this observation, a heated Stage II canister was made as shown in FIG. 3. Experiments were conducted to prove the concept by using a 200 cc Stage II canister with 200 cc of activated carbon granules identical to those used in the above-described tests.

Figure 6:
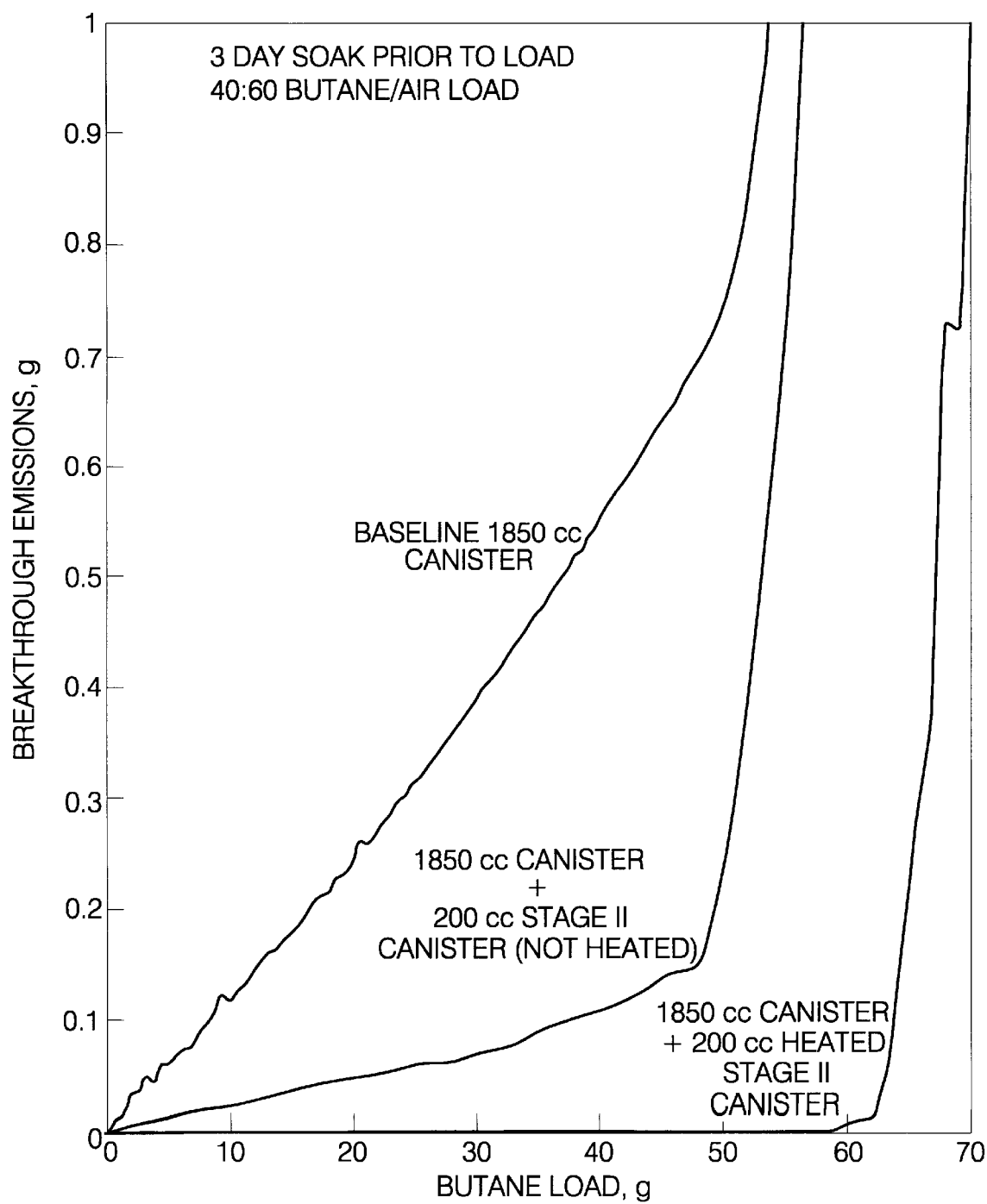
FIG. 6 is a graph using the same ordinates as FIG. 4 but comparing baseline canister performances with a canister utilizing the subject invention.

The heel concentration in the Stage II canister was near-zero after every heated purge as determined by the Stage II canister weight change. Effectiveness of Stage II canister in reducing the breakthrough emissions was measured and the results are shown in FIG. 6. For comparison, a non-heated Stage II canister system is also included in FIG. 6. The results clearly show that the heated Stage II canister is very effective in reducing the canister breakthrough emissions to very low levels.

It is noted that in this early experiment the 200 cc volume of the Stage II canister was nearly ten percent of the total of the primary (1850 cc) and secondary volumes. It has been found that the volume of the Stage II canister or secondary volume can be smaller, less than 50 cc (or less than 2.5% to 3% of the total of 1900 cc), for reducing breakthrough emissions in the SHED test. This, of course, means that the energy requirement for heating the secondary volume of adsorbent can be reduced.

At illustrated above, the secondary volume of adsorbent may be located in the same canister as the primary volume or it may be located in a separate heated canister upstream of the primary adsorbent volume with respect to purge air flow (or downstream of the flow path during vapor storage).

The temperature sensors 100 (in FIG. 1) and 200 (in FIG. 2) can be eliminated by using a heater (heater 96 in FIG. 2 and heater 196 in FIG. 3) made of a self-regulating positive temperature coefficient material.

While the invention has been described in terms of certain preferred embodiments, it is recognized that other could readily be made by one skilled in the art. Accordingly the scope of the invention is to be considered limited by the following claims.

What is claimed is:

1. An evaporative emissions control system for a vehicle, said system comprising, in combination, a fuel tank for storing a volatile fuel, an engine having an air induction system and adapted to consume said fuel, a canister containing a first volume of fuel vapor adsorbent material for temporarily adsorbing and storing fuel vapor from said tank, a conduit for conducting fuel vapor from said tank to a canister vapor inlet, a fuel vapor purge conduit from a canister purge outlet to said induction system of said engine, and a vent/air inlet for venting said canister and for admission of air to said canister during operation of said engine induction system;

said canister defining an air flow path through said first volume of adsorbent between a first region of said canister at said vent/air inlet and a second region at said purge outlet, and a vapor flow path from said vapor inlet toward said vent/air inlet, such that fuel vapor formed in said tank flows through said vapor inlet into said first volume of adsorbent where it is adsorbed and, during operation of said engine induction system, ambient air flows in a path to and through said vent/air inlet and along said air flow path in said canister through said first volume and said purge outlet to the induction system of said engine, said flow of air removing a portion of said adsorbed fuel vapor but leaving a residue of fuel in said first volume;

said emissions control system further comprising a second volume of adsorbent, smaller than said first volume, said second volume being located either inside of said canister within said first region or outside of said canister but in the flow path of said ambient air to said vent/air inlet and said first region, and heating means within said second volume adapted and controllable to heat said second volume of adsorbent prior to said flow of air to a temperature at which said air flowing through said second volume removes substantially all adsorbed fuel.

2. An evaporative emissions control system as recited in claim 1 in which said second volume of adsorbent is located within said first region of said canister.

3. An evaporative emissions system as recited in claim 1 in which said second volume of adsorbent is contained outside of said canister in the flow path of ambient air to said vent/air inlet.

4. An evaporative emissions system as recited in claim 1 in which said second volume is about one to ten percent of said first volume.

5. An evaporative emissions system as recited in claim 1 in which said second is about one to five percent of said first volume.

6. An evaporative emissions control system as recited in any one of claims 1–5 in which said fuel vapor adsorbent material consists essentially of activated carbon granules.

7. A second stage adsorbent filled canister for use in an emissions control system for a vehicle, said system comprising, in combination, a fuel tank for storing a volatile fuel, an engine having an air induction system and adapted to consume said fuel, a first stage canister containing a first volume of fuel vapor adsorbent material for temporarily adsorbing and storing fuel vapor from said tank, a conduit for conducting fuel vapor from said tank to a first stage canister vapor inlet, a fuel vapor purge conduit from a first stage canister purge outlet to said induction system of said engine, and a vent/air inlet for venting said first stage canister and for admission of air to said first stage canister during operation of said engine induction system;

said second stage canister comprising a second volume of fuel vapor adsorbent material for temporarily adsorbing and storing fuel vapor overflowing said first stage canister, a vapor inlet/purge outlet for receiving said vapor from said first stage canister, a vent/air inlet, a fuel vapor flow path from said vapor inlet/purge outlet through said second volume to said vent/air inlet, a flow path through said second volume for ambient air induced to flow during said engine operation from said vent/air inlet to said vapor inlet/purge outlet and heating means within said second volume adapted to heat said second volume of adsorbent to a temperature at which said air flowing through said second volume removes substantially all adsorbed fuel.

8. A second stage canister as recited in claim 7 in which said second volume is in the range of about one to ten percent of said first volume.

9. A second stage canister as recited in claim 7 in which said second volume is in the range of about one to five percent of said first volume.

10. In the method of operating an evaporative fuel emissions control system in combination with an engine adapted to consume said fuel, said method comprising directing, during, a period when said engine is not running, the flow of fuel vapor emanating from a fuel tank into a first volume of fuel adsorbent material, said first volume having a vapor inlet and a vent, said vapor flowing in a first direction from said inlet toward said vent, to temporarily adsorb said vapor and, thereafter, during a following period of engine operation, promoting a flow of ambient air in an opposing path, through said vent and said first volume of adsorbent material to a air purge outlet, by the action of an engine air induction system, said flow of air removing some, but not all, of the adsorbed fuel from said first volume of adsorbent material and carrying it to said engine in which it is consumed, and in which method said adsorbing and removing of vapor is cyclically repeated, and wherein the capacity of said first volume of adsorbent is sometimes exceeded and fuel vapor escapes the first volume of adsorbent to the atmosphere, the improvement comprising;

placing a second volume of adsorbent material in a location downstream of said vapor flow vent of said first volume of fuel adsorbent and upstream of said vent, with respect to the direction of said vapor removing air flow, and in the flow path of said airflow, said second volume being no greater than about ten percent of said first volume, and prior to each cycle of promoting said air flow, heating said second volume of adsorbent to a temperature enabling the subsequent airflow to remove substantially all adsorbed fuel from said second volume of adsorbent and thereby reduce the escape of fuel vapor from said control system during the subsequent vapor adsorption cycle.

11. A method as recited in claim 8 in which said absorbent material consists essentially of carbon granules.

12. A method as recited in claim 8 in which said second volume of adsorbent material is contiguous with said first volume of adsorbent material in a common canister.

13. A method as recited in claim 8 in which said second volume of adsorbent material is contained in a second canister and said first adsorbent volume is contained in a first canister.

14. A method as recited in claim 8 comprising heating said second volume of adsorbent material prior to and during a portion of each period of air flow.

* * * * *